April 11, 1961
E. F. PIERCE
2,978,865
TURBO FAN EXHAUST MIXING DEVICE
Filed Feb. 6, 1956
2 Sheets-Sheet 1
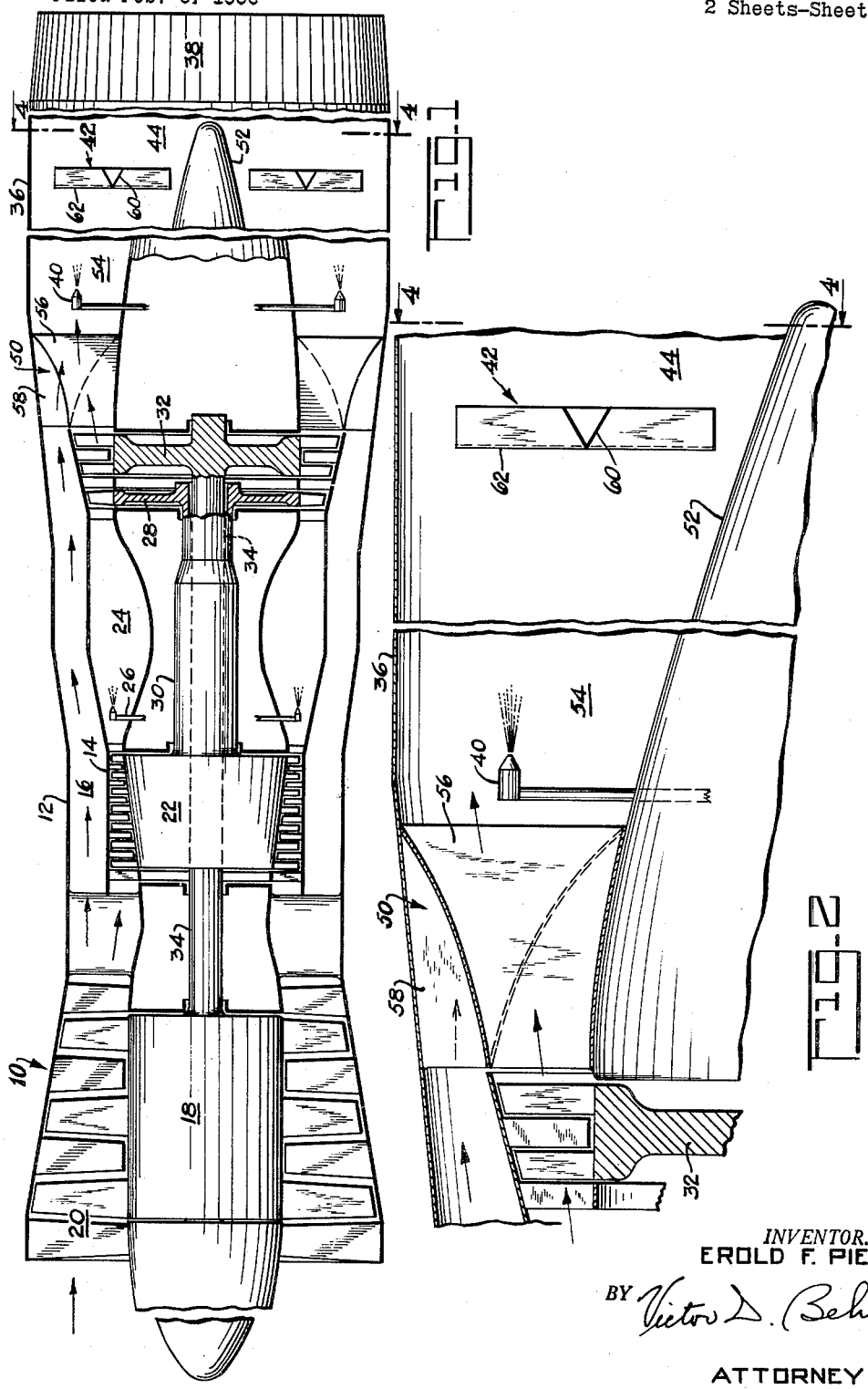
INVENTOR.
EROLD F. PIERCE
BY
ATTORNEY

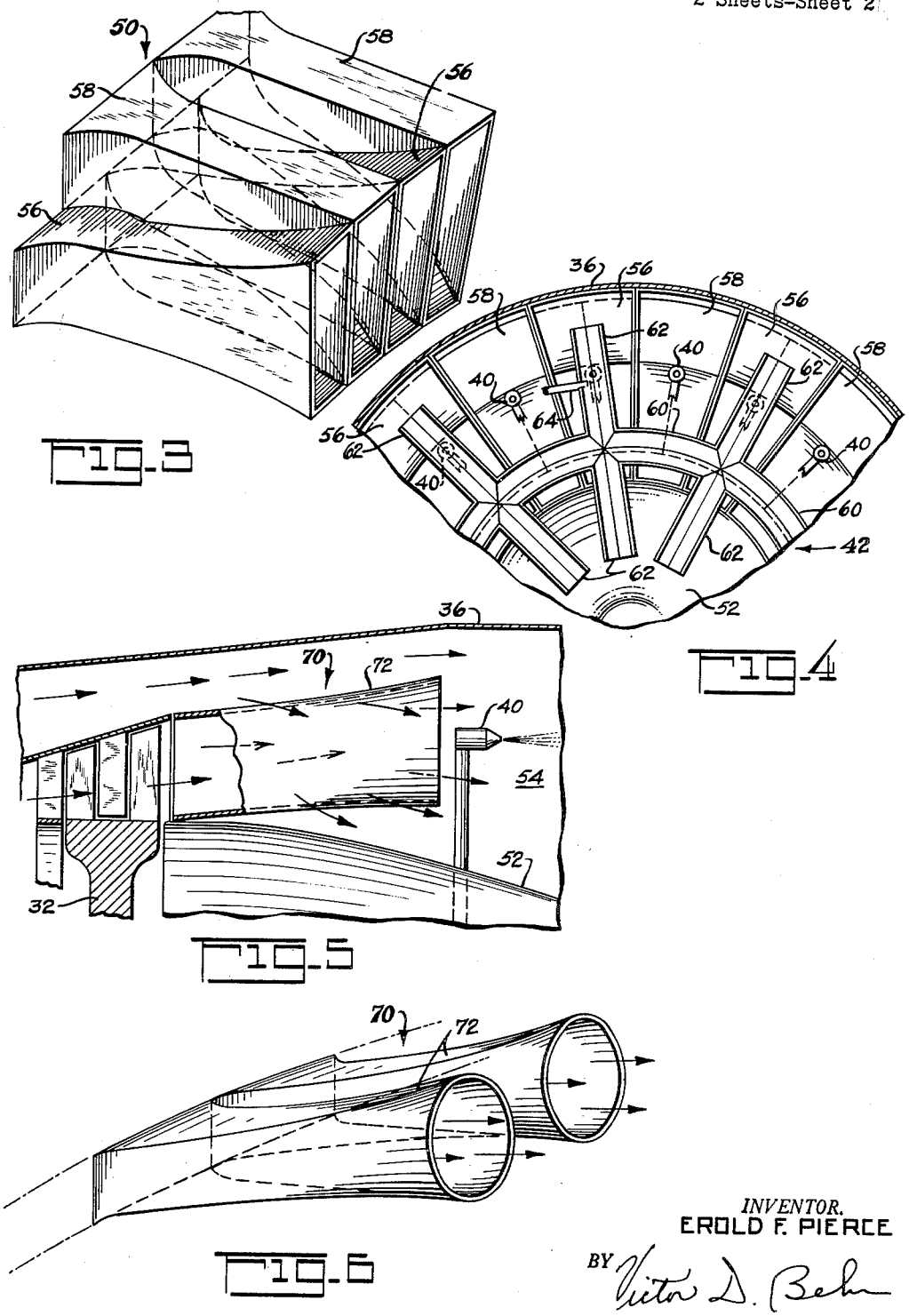

United States Patent Office 2,978,865
Patented Apr. 11, 1961

2,978,865

TURBO FAN EXHAUST MIXING DEVICE

Erold F. Pierce, Allendale, N.J., assignor to Curtiss-Wright Corporation, a corporation of Delaware Filed Feb. 6, 1956, Ser. No. 563,479

1 Claim. (Cl. 60—35.6)

This invention relates to gas turbine jet engines and is particularly directed to such engines in which a portion of the air taken in by the engine is by-passed around the gas turbine combustion chamber and turbine and then mixed with the turbine exhaust for example as in a turbo fan engine.

As used herein a "turbo fan" engine comprises a turbo-jet engine with its compressor, combustion chamber, turbine, and means drivably connecting the turbine and compressor and in addition said engine includes a passage around the combustion chamber and turbine for by-passing a substantial portion of compressor air therethrough, said by-pass air and the turbine exhaust discharging rearwardly through an exhaust nozzle structure. The thrust of such a turbo-fan engine can be increased by the addition of an afterburner. For maximum thrust augmentation the air in both the turbine exhaust and in said by-pass passage should be used for afterburner combustion. Separate afterburning in the turbine exhaust and by-pass air has the obvious disadvantage of requiring two afterburner structures whereas if the by-pass air and turbine exhaust were first mixed only a single afterburner structure would be required. In addition combustion in the by-pass air is difficult to initiate because of the relatively low temperature of said air. On the other hand complete mixing of the by-pass and exhaust gases prior to combustion in an afterburner would take substantial time and therefore result in a much longer engine than would be the case if such mixing were not provided.

An object of the present invention comprises the provision of a novel and simple mixing device in a by-pass engine for obtaining good mixing of the relatively cool by-pass air and relatively hot turbine exhaust in a relatively short time. A still further object of the invention comprises the provision of such a mixing device with an afterburner arrangement facilitating combustion even though mixture of said relatively hot and cool gases is not complete.

Other objects of the invention will become apparent upon reading the annexed detailed description in connection with the drawing in which:

Fig. 1 is an axial sectional view through a turbo-fan engine embodying the invention;

Fig. 2 is an enlarged view of a portion of Fig. 1;

Fig. 3 is a perspective view of several adjacent mixing tubes;

Fig. 4 is an enlarged view taken along line 4—4 of Figs. 1 and 2;

Fig. 5 is a view similar to Fig. 2 but illustrating a modified construction; and Fig. 6 is a perspective view of a pair of mixing tubes of Fig. 5.

Referring first to Fig. 1 of the drawing, a turbo-fan engine 10 is illustrated as comprising an outer annular shell 12 and an inner annular shell 14 concentrically supported within the shell 12 so as to leave an annular path 16 therebetween. A low pressure axial flow compressor 18 is journaled within the shell 12 forwardly of the inner shell 14. The compressor 18 receives air through the forwardly directed inlet 20 formed at the forward end of the shell 12. The compressor 18 delivers a portion of its air to the annular path 16 and the remaining portion to a high pressure axial flow compressor 22 journaled within the inner shell 14.

The high pressure compressor 22 supplies its air to an annular combustion chamber 24 where heat is added to said air by burning fuel therein, said fuel being supplied by burner apparatus schematically indicated at 26. From the combustion chamber 24 the hot gases coact with the blades of a high pressure turbine 28 for driving said turbine. A shaft 30 drivably connects the high pressure turbine 28 with the high pressure compressor 22. The hot gases exhausting from the high pressure turbine 28 coact with the blades of a low pressure turbine 32 for driving said latter turbine. The low pressure turbine 32 is drivably connected to the low pressure compressor 18 by a shaft 34 extending co-axially through the shaft 30. The high pressure compressor 22, combustion chamber 24 and turbines 28 and 32 provide an annular fluid path co-axial with and surrounded by the annular fluid path 16. From the low pressure turbine 32 the hot gases discharge into an exhaust duct 36 formed by a rearward extension of the outer shell 12 beyond the turbine assembly 28 and 32. The air supplied through the annular fluid path 16 by the compressor 18 also discharges into the duct 36. The exhaust duct 36 has a rearwardly directed exhaust nozzle 38 at its rear end through which the air from the fluid path 16 and the hot gases from the turbine assembly discharge into the surrounding atmosphere whereby the engine 10 is provided with forward propulsive thrust.

For increasing the thrust output of the engine 10 provision is made for afterburning in the exhaust duct 36. For this purpose fuel nozzles 40 are provided for introducing fuel into the exhaust duct 36 upstream of flameholder apparatus 42 for combustion in the duct 36 downstream of said flameholder apparatus. Thus the portion 44 of the space inside the duct 36 downstream of the flameholder apparatus 42 forms the afterburner combustion chamber.

As previously stated, the air in the annular by-pass path 16 and the exhaust gases from the turbine 32 both discharge into the exhaust duct 36. Said gases should be thoroughly mixed upstream of the flameholder apparatus 42 for efficient combustion in the afterburner combustion chamber 44. At this point it should be noted that as is true of turbo-jet engines the gases discharging from the turbine 32 contain a large percentage of air so that this air is available with the air from the by-pass path 16 for afterburner combustion. Tubular fluid mixing means 50 is provided for conveying said by-pass air and said turbine exhaust from their respective paths into the exhaust duct 36 so as to facilitate the mixing of said fluids. The details of said fluid mixing means 50 are best seen in Figs. 2 and 3.

A centerbody or cone 52 extends downstream from the turbine 32 into the duct 36 so that the upstream portion 54 of the passage formed by the duct 36 is annular. The fluid mixing means 50 is disposed at the upstream end of said annular portion 54 of the duct 36 and comprises a plurality of tube elements 56 and a plurality of tube elements 58. The upstream ends of the tube elements 56 are circumferentially disposed in side-by-side relation to form an annular structure co-axial with the turbine 32 and disposed to receive all the gases discharging from the turbine 32. The cross-section of each tube element 56 decreases in circumferential width and increases in radial height as the downstream end of the tube element is approached. At their downstream ends the tube elements are circumferentially-spaced and each tube element extends radially across the entire radial width of the annular passage 54.

The upstream ends of the tube elements 58 are circumferentially disposed in side-by-side relation to form an annular structure disposed across the discharge end of the annular flow path 16 so as to receive all the fluid air flowing through said path. Like the tube elements 56, the cross-section of each tube element 58 decreases in circumferential width and increases in radial height as the downstream end of the tube element is approached. The downstream ends of the tube elements 58 are disposed between, so as to alternate with, the downstream ends of the tube elements 56 and, like the tube elements 56, the downstream ends of the tube elements 58 extend across the entire radial width of the annular exhaust passage 54.

With the aforedescribed construction of the tubular mixing device 50, the relatively hot gas exhaust of the turbine 32 is received by the tube elements 56 and discharges therefrom as a plurality of circumferentially-spaced exhaust gas streams. Similarly the relatively cool by-pass air flowing through the annular path 16 is received by the tube elements 58 and discharges therefrom as a plurality of circumferentially-spaced streams disposed between said exhaust gas streams. This stratification of the turbine exhaust and by-pass air into a plurality of small streams circumferentially alternating with each other results in a more complete mixing of said two gas streams in a short time.

Because of the controlled stratification of the hot and cold gases as provided by the tubular mixing device 50 it is not essential that complete mixing of the two gases take place upstream of the afterburner flameholders 42. If stratification of the hot and cold gas streams still exists at said flameholders it is possible with the present invention to take advantage of the controlled stratification produced by the fluid mixing tube means 50 to locate the flameholder units in the relatively hot or exhaust gas stream since ignition can be more easily established in this stream. The flameholder structure 42 is so arranged.

As best seen in Fig. 4 the flameholder structure 42 includes an annular V-shaped gutter 60 with a plurality of circumferentially-spaced radially extending V-shaped gutters 62 each disposed in alinement with the hot exhaust gas stream discharging from one of the mixing tubes 56. The open side of each of the V-shaped gutters 60 and 62 opens in a downstream direction. Suitable igniter means, for example a spark igniter 64 is provided for igniting the afterburner combustion mixture at one or more of the flameholder gutters 62, the annular V-gutter 60 functioning as a flame cross-over tube for ignition of the mixture at the other gutters 62. The combustion flame initiated at the radial V-gutters 62 spreads laterally across the combustible mixture flowing between said gutters to ignite said mixture including any relatively cool mixture formed by the relatively cool air discharging from the tubes 58 which, by the time it reaches the afterburner flameholder structure, may not be thoroughly mixed with the relatively hot gases discharged by the tubes 56. Obviously the afterburner flameholder structure is not limited to the precise structure illustrated. For example it is not essential that there be one gutter 62 for each mixing tube 56. Nor is it essential that there be but one flame cross-over gutter 60 or that it be disposed across the mid-portions of the gutters 62 as illustrated.

Reference is now made to Figs. 5 and 6 which show a modified construction of the fluid mixing means 50 of Figs. 1–4. In Figs. 5 and 6 tubular fluid mixing means 70 comprises a plurality of tube elements 72. The upstream ends of the tube elements 72 are circumferentially disposed in side-by-side relation to form an annular structure co-axial with the turbine 32 and disposed to receive all the gases discharging from said turbine. The downstream ends of the tube elements 72 are circumferentially-spaced from each other in an annulus disposed concentric with and disposed approximately midway between the side walls of the annular exhaust passage 54. The air from the fluid path 16 discharges directly into said annular exhaust passage 54. With this arrangement the tube elements 72 discharge the relatively hot exhaust gases into the annular exhaust passage 54 in a plurality of circumferentially-spaced streams radially spaced from the walls of said passage and surrounded by the fluid (relatively cool air) discharging in said annular passage 54 from the annular path 16. In this way rapid mixing of the relatively hot and cold fluids in the exhaust duct 36 is assured. Obviously in lieu of the tube elements 72 receiving the exhaust from the turbine 32 said tube elements could have their upstream ends modified and arranged to receive the relatively cool air from the annular path 16. With this latter arrangement the relatively cool air from the annular path 16 would be discharged into the exhaust duct 36 in a plurality of circumferentially-spaced streams each surrounded by the hot fluid discharged into said duct 36 from the turbine 32.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A gas turbine jet engine having a turbine, a combustion chamber for supplying turbine motive fluid to said turbine for driving said turbine, said combustion chamber and turbine providing a first fluid path; means providing a second fluid path by-passing said combustion chamber and turbine; compressor means drivably connected to said turbine for supplying air to said by-pass path and to said first path for combustion with fuel in the combustion chamber of said first path; an exhaust duct into which discharges relatively cool by-pass fluid from said second path and relatively hot fluid exhausting from the turbine end of said first path, said exhaust duct having a rearwardly directed nozzle through which said fluids discharge into the surrounding atmosphere; means for conveying said relatively hot fluid from its path into said exhaust duct so as to split up said fluid into a plurality of spaced streams; means for adding fuel to the fluid within said exhaust duct for combustion therein; and a plurality of spaced flameholder elements each disposed in said exhaust duct in the flow path of one of said hot fluid streams for initiating combustion therein.

References Cited in the file of this patent

UNITED STATES PATENTS

| | | |
|---|---|---|
| 2,443,250 | Johnson | June 15, 1948 |
| 2,588,532 | Johnson | Mar. 11, 1952 |
| 2,753,685 | Mattinson | July 10, 1956 |